J. J. THOMAS.
Harrow.
No. 82,451. Patented Sept. 22, 1868.
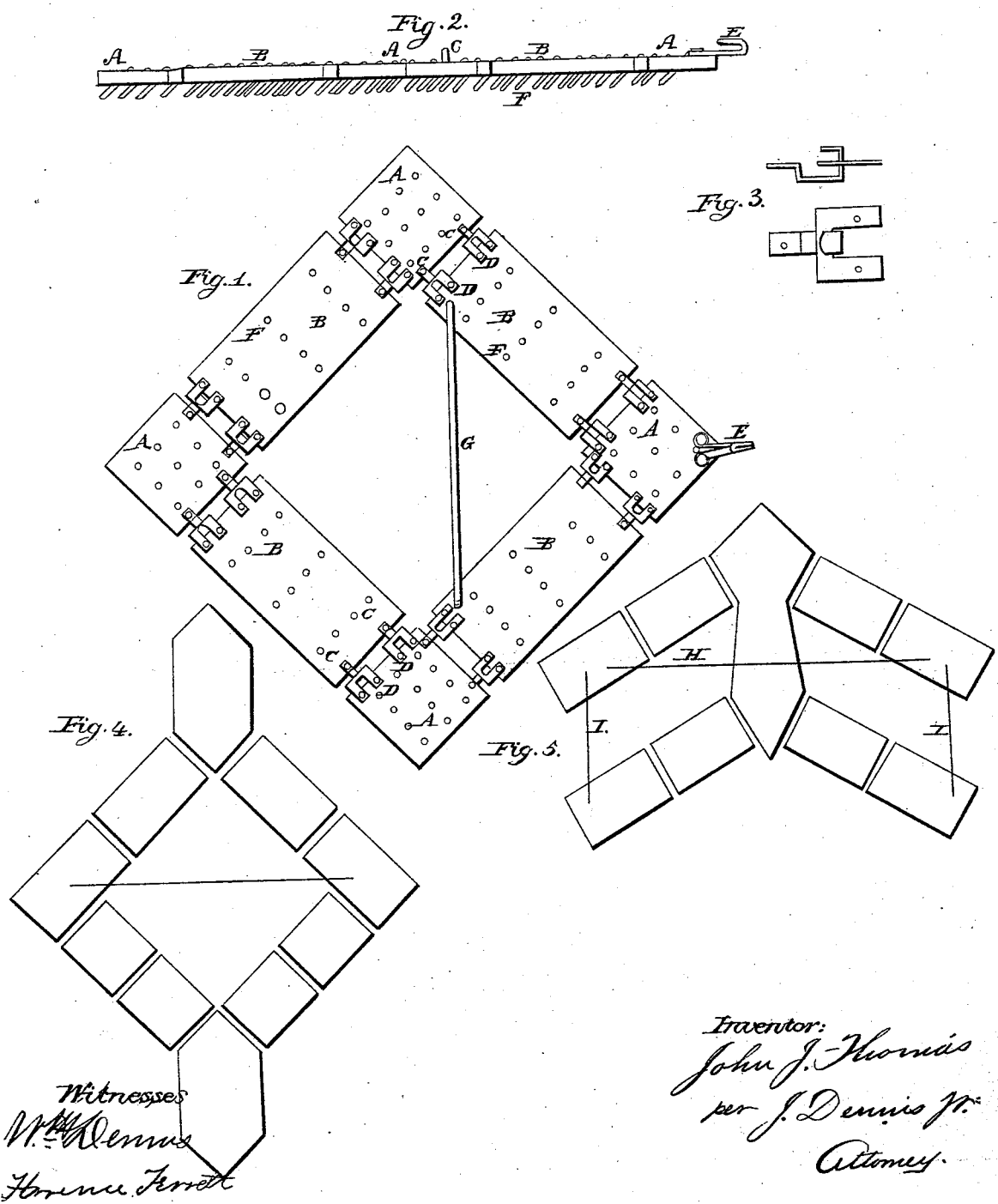

UNITED STATES PATENT OFFICE.

JOHN J. THOMAS, OF UNION SPRINGS, NEW YORK.

IMPROVEMENT IN HARROWS.

Specification forming part of Letters Patent No. 82,451, dated September 22, 1868.

*To all whom it may concern:*

Be it known that I, JOHN J. THOMAS, of Union Springs, Cayuga county, State of New York, have invented a new, useful, and Improved Land-Brush or Spiked Harrow; and I do hereby declare the following description and accompanying drawings are sufficient to enable any person skilled in the art or science to which it most nearly appertains to make and use my said invention or improvements without further invention or experiment.

The object of my invention and improvements is to make a land-brush, or a substitute for the roller, to follow the common harrow and smooth the surface of the ground, cover grass-seed, &c., and also for brushing the surface of winter-grain in the spring, pulverizing and spreading top-dressing on grass-land, brushing the surface of young corn and potatoes when coming up, and various other purposes on a farm.

It consists of several pieces of plank hinged together, and forming a kind of flexible frame, which yields readily to the undulating surface of the ground. These pieces of plank are provided with numerous small teeth, arranged at an inclined angle, pointing backward, so as to readily pass over any rubbish or obstructions, and pass over the ground without tearing up young plants, but pulverize the surface.

In the accompanying drawings, Figure 1 is a plan or top view of the land-brush. Fig. 2 is an elevation as seen diagonally. Fig. 3 is one of the hinges.

In these drawings, A A are four rectangular pieces of plank, hinged to the four oblong rectangular pieces of plank B B, as shown in the drawing, forming a kind of flexible rectangular frame, as shown in Fig. 1. The pieces of plank B B are about twice as long as the pieces A A.

The hinges consist of the hooks C C and loops D D, (shown in Fig. 3,) and they are fastened to the pieces of plank, so that they can be readily unhooked and separated for storing away, or packing for transportation, or other purposes.

The hook E is fastened to the corner of one of the pieces of plank A, to hitch the horse or team to to draw the brush one corner forward. I bore numerous holes in each piece of plank, at an angle of about forty-five degrees, so that the heads of the nails or spikes F F will lean forward, which form the teeth, and their points incline backward, so as to readily cast off or slip over the stalks of weeds, straw, or other matter which they may encounter in use, so that the teeth will not become clogged and furrow the land.

To keep the brush spread when it is used, I put a bar, G, of wood or metal, across it, with pins at each end, which project down through holes in the plank, which are made large enough to let the planks vibrate freely on the pins.

As the teeth of my land-brush are designed to be small and short, I use railroad or other spikes for the teeth.

The pieces of plank which compose my land-brush may be varied in size, and the number of pieces used, and the manner, arrangement, or hooking together, to adapt it to the purpose for which it is to be used, or the soil, or strength of team. One modification of it is shown in Fig. 4, and another in Fig. 5. In the latter figure the parts are kept spread by the bars H and I, with their ends loosely connected to permit the plank to vibrate.

I claim—

A land-brush or spiked harrow constructed of pieces of plank, hinged together as described, and provided with numerous inclined teeth, pointing backward at such an inclination as to cast off or slip over any stalks of weeds, straw, or other refuse matter, substantially as described.

JOHN J. THOMAS.

Witnesses:
LEVI COLLINS,
LOUISA THOMAS.